United States Patent [19]

Loup

[11] Patent Number: 5,462,483
[45] Date of Patent: Oct. 31, 1995

[54] HEATING AND VENTILATING AND/OR AIR CONDITIONING APPARATUS FOR THE CABIN OF A MOTOR VEHICLE

[75] Inventor: Didier Loup, Maurepas, France

[73] Assignee: Valeo Thermique Habitacle, Le Mesnil, France

[21] Appl. No.: 160,556

[22] Filed: Dec. 1, 1993

[30] Foreign Application Priority Data

Dec. 2, 1992 [FR] France .................................. 92 14522

[51] Int. Cl.⁶ ...................................................... B60H 1/26
[52] U.S. Cl. ............................................. 454/160; 454/152
[58] Field of Search ................................. 454/121, 126, 454/152, 155, 156, 159, 160, 161

[56] References Cited

U.S. PATENT DOCUMENTS 5,062,473  11/1991  Ostrand et al. ............................ 165/42

FOREIGN PATENT DOCUMENTS

| 180053 | 5/1986 | European Pat. Off. | 454/152 |
| 289065 | 11/1988 | European Pat. Off. | 454/155 |
| 392296 | 10/1990 | European Pat. Off. | |
| 4000990 | 7/1991 | Germany. | |
| 151410 | 9/1982 | Japan | 454/155 |
| 39508 | 3/1983 | Japan | 454/152 |

OTHER PUBLICATIONS

Patent Abstracts of Japan, vol. 6, No. 256 (M-179)(1134) Dec. 15, 1982 of JP-A-57 151 410 (Nissan Jidosha) Sep. 18, 1982.

*Primary Examiner*—Harold Joyce
*Attorney, Agent, or Firm*—Morgan & Finnegan, LLP

[57] ABSTRACT

In a heating and ventilating apparatus for the cabin of a motor vehicle, with or without air conditioning, the apparatus comprises at least one first duct and at least one second duct, which are arranged to deliver, respectively, a stream of cold air and a stream of mixed air through a common aerator vent communicating with the cabin of the vehicle. The apparatus includes a first flap valve for controlling the flow of cold air at the outlet end of the first duct, together with a second flap valve which is arranged to control the flow of the mixed air at the outlet of the second duct. First and second control means are provided for acting on the first and second flap valves respectively.

9 Claims, 3 Drawing Sheets

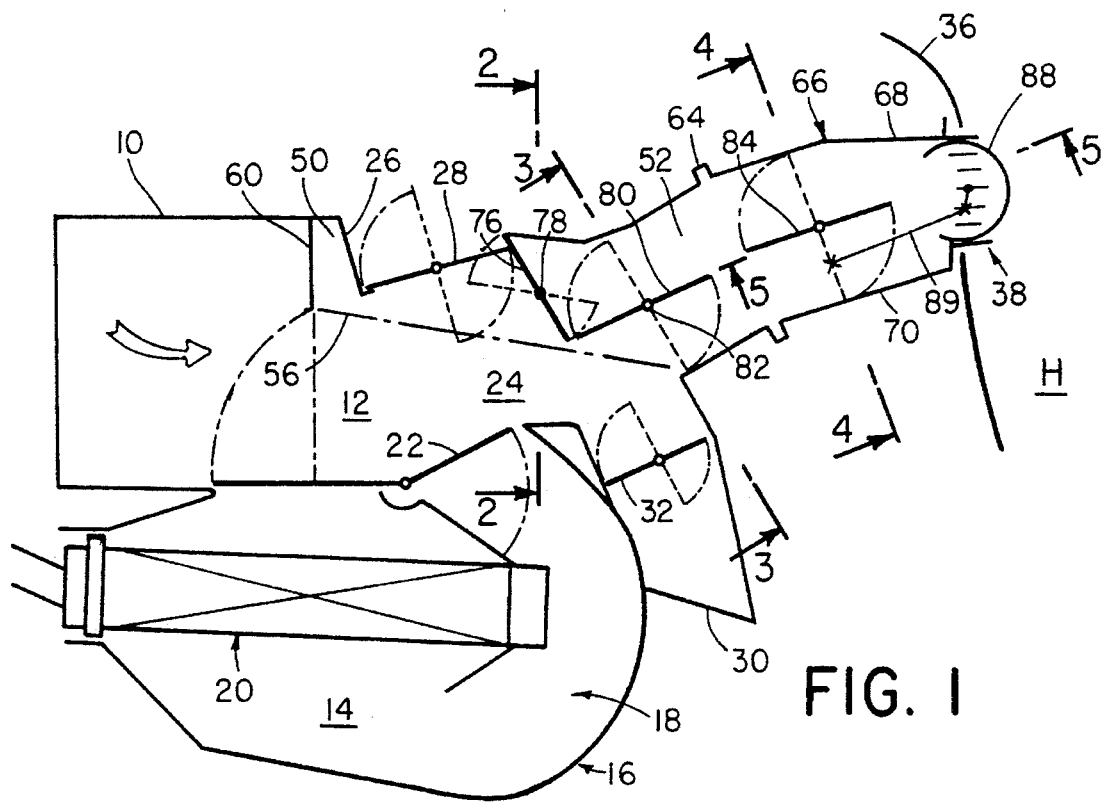
FIG. 1
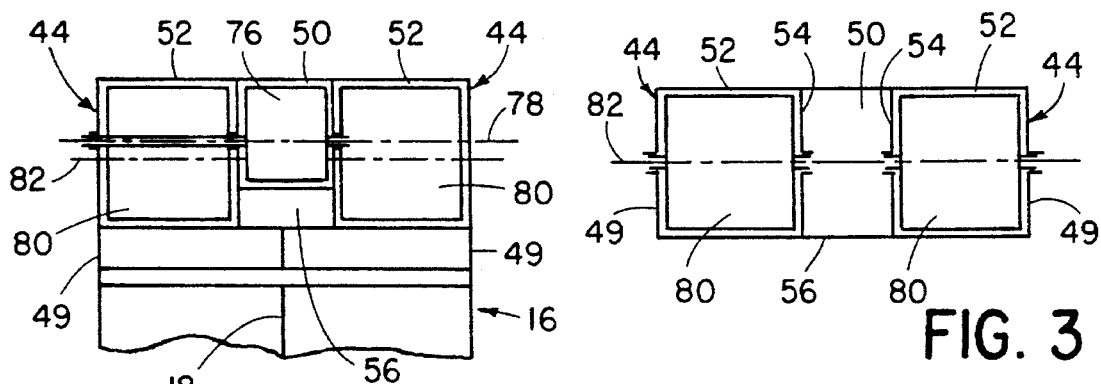
FIG. 2
FIG. 3
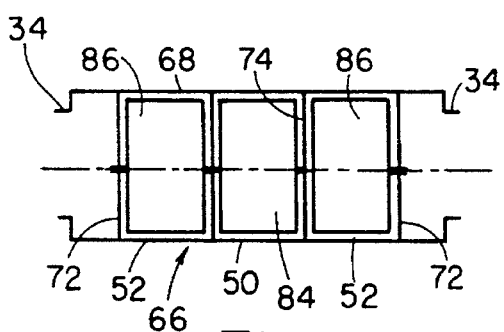
FIG. 4
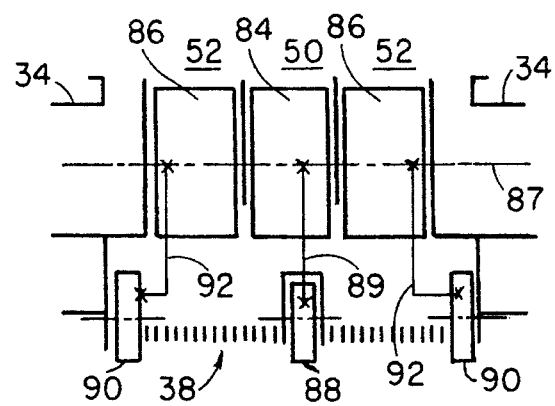
FIG. 5

HEATING AND VENTILATING AND/OR AIR CONDITIONING APPARATUS FOR THE CABIN OF A MOTOR VEHICLE

FIELD OF THE INVENTION

This invention relates to a heating and ventilating apparatus, with optional air conditioning facility, for the cabin of a motor vehicle. Most particularly, it is concerned with such an apparatus of the type including a cold air duct and a mixed air duct, which are adapted to deliver a cold air stream and a mixed air stream respectively through a common aerator vent which communicates with the cabin of the vehicle.

BACKGROUND OF THE INVENTION

In known apparatus of this type, the cold air may consist either of fresh air drawn from outside the cabin, which may then be air Conditioned, or else recycled air drawn from inside the cabin.

The mixed air is air which has been adjusted in temperature by mixing two streams of air together in adjustable proportions, namely a stream of the said cold air and a stream of warm air. The warm air is obtained by heating all or some of the cold air in a heat exchanger, typically by heat transfer from the coolant liquid of the engine of the vehicle. The temperature of the mixed air is thus always greater than that of the cold air. The mixed air is then delivered through various air vents, so as to be distributed into different parts of the cabin of the vehicle in accordance with selected distribution modes. These air vents generally comprise at least one deicing and de-misting vent arranged at the base of the windshield, at least one vent communicating with the lower part of the cabin for heating the feet of the occupants, side vents arranged at the two ends of the fascia, and at least one further vent which is arranged on the fascia so as to direct air towards the bodies and faces of the front occupants of the vehicle.

This last mentioned vent, which is typically arranged in the middle of the fascia and which may also be referred to as an aerator, or an aerator vent, delivers not only mixed air but also cold air, so that the occupants of the vehicle receive air at a lower temperature than that of the mixed air which is delivered behind the windshield or towards the feet of the occupants or the side windows. In this way the air is delivered at two different temperature levels, which leads to improved comfort and improved safety for the occupants, and particularly for the driver.

One apparatus of the type discussed above is known from the specification of German published patent application No. DE 3 338 768A, in which a single flap valve is provided for controlling the cold air stream and the mixed air stream at the outlet of the cold and mixed air ducts and at the inlet of a common duct which terminates at the aerator vent. The main drawback of that arrangement lies in the fact that it is not possible to modify the flow of cold air and mixed air independently of each other. As a result, this known apparatus either delivers cold air and mixed air simultaneously, though always in the same proportion, or else it interrupts the delivery of both the cold air and the mixed air.

Due to the fact that the cold air and the mixed air are always delivered in the same proportion through the common aerator vent, the temperature of the air leaving this vent is always the same at any given setting of the temperature of the mixed air.

DISCUSSION OF THE INVENTION

A main object of the invention is to overcome the above mentioned drawbacks.

According to the invention, an apparatus for heating and ventilating, and/or air conditioning, the cabin of a motor vehicle, comprising at least one first duct and at least one second duct, adapted to distribute respectively a stream of cold air and a stream of mixed air through a common aerator vent communicating with the cabin of the vehicle, is characterised in that it includes a first flap valve adapted to control the flow of the cold air stream leaving the said first duct, and a second flap valve adapted to control the flow of the mixed air stream leaving the said second duct, together with first control means for acting on the first flap valve, and second control means for acting on the second flap valve.

The above arrangement enables the apparatus to be used for adjusting the flow of the fresh air stream and also the flow of the mixed air stream, and consequently the temperature of the resulting air stream, consisting of a mixture of the cold and mixed air, which is delivered into the cabin of the vehicle via the above mentioned aerator vent. The temperature of the air emerging from the aerator vent can be adjusted to the required value between the temperature of the cold air and that of the mixed air.

In preferred embodiments of the invention, the said first flap valve is a pivoting flap valve which is adapted to assume a multiplicity of positions between an open position and a closed position with respect to the first duct.

Preferably, the second flap valve is also a pivoting flap valve adapted to assume a multiplicity of positions between an open position and a closed position with respect to the second duct.

The first control means acting on the first flap valve preferably comprise a rotatable thumb wheel which drives the flap valve in rotation via a coupling member, which may for example be in the form of an actuating rod or a crank. Similarly, the second control means acting on the second flap valve preferably comprise another rotatable thumb wheel, acting on the second flap valve through a coupling member which may be an actuating rod or crank.

In preferred embodiments of the invention, the apparatus includes a first cold air distribution duct controlled by a first flap valve and arranged between two second ducts for distribution of the mixed air, each of the said second ducts being controlled by an associated second flap valve. Thus the two second ducts may be arranged to serve the right hand and the left hand parts, respectively, of the aerator vent, which is then situated in the middle of the fascia of the vehicle. In such a preferred embodiment of the invention, the aerator vent preferably comprises two grilles, one of which is arranged so that the mixed air stream from one of the two second ducts, and some of the cold air from the first duct, pass together through that grille, while the mixed air from the other second duct, and the remainder of the air from the first duct, pass together through the other grille. Thus, the respective temperatures of the two air streams emerging from the two grilles of the aerator vent can be easily adjusted.

According to another preferred feature of the invention, the first control means comprises a first rotatable thumb wheel located between the two grilles and actuating the first flap valve, while the second control means comprises a separate second rotatable thumb wheel for each of the second flap valves.

According to yet another preferred feature of the invention, the apparatus includes a mixing chamber arranged downstream of the outlets of the first and second ducts and upstream of the aerator vent. This mixing chamber facilitates mixing of the cold air stream from the second duct with the warm air stream from the second duct, as a result of which the temperature of the air stream which is delivered into the cabin through the aerating vent can be very satisfactorily homogenised.

Further features and advantages of the invention will appear more clearly on a reading of the detailed description, of preferred embodiments of the invention, which follows and which is given by way of example only and with reference to the accompanying drawings.

BRIEF DESCRIPTION OF THE DRAWINGS

FIG. 1 is a diagrammatic view in longitudinal cross section, showing one heating and ventilating, and/or air conditioning, apparatus in accordance with the invention.

FIG. 2 is a view in cross section taken on the line II—II in FIG. 1.

FIG. 3 is a view in cross section taken on the line III—III in FIG. 1.

FIG. 4 is a view, in cross section taken on the line IV—IV in FIG. 1.

FIG. 5 is a partial view in cross section taken on the line V—V in FIG. 1.

DESCRIPTION OF PREFERRED EMBODIMENTS OF THE INVENTION

Figures 6, 7:
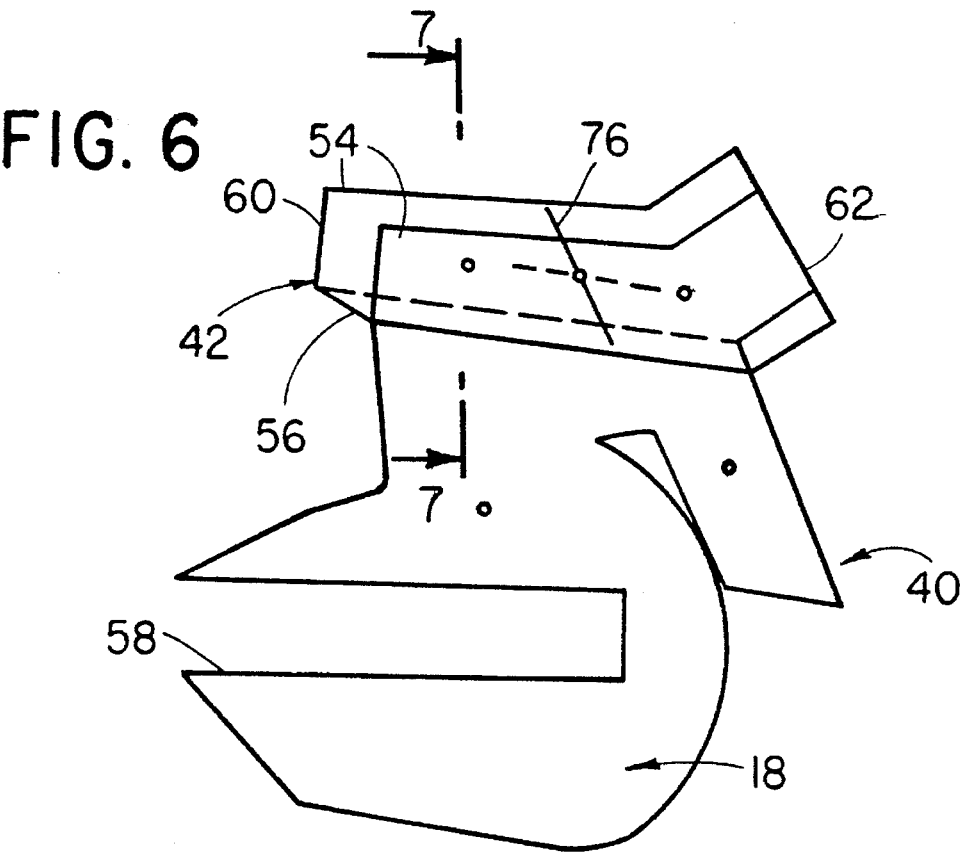
FIG. 6 is a diagrammatic view, seen in perspective, of the central casing of the apparatus of FIG. 1.
FIG. 7 is a partial view on a larger scale, in cross section taken on the line VII—VII in FIG. 6.

The apparatus shown in FIG. 1 comprises a blower 10 which is arranged to deliver cold air, taken either from outside the cabin H of a motor vehicle, or from inside the cabin H. In the former case, the air is fresh air (which may however be air conditioned), while in the latter case the air delivered by the blower is of course recycled air.

The cold air delivered by the blower 10 is directed towards a cold air transmission branch 12 and an air heating branch 14. Both of these two branches 12 and 14 are defined within a casing 16 which is divided by a bisecting or central bulkhead 18. Accordingly, the bulkhead 18 defines within the casing 16 two symmetrical regions which serve the right hand and left hand parts, respectively, of the cabin H of the vehicle. The bulkhead 18 also divides each of the branches 12 and 14 into two symmetrical parts.

The air heating branch 14 has a U-shaped configuration, and contains a heat exchanger 20 which is supplied with the cooling liquid from the engine of the vehicle. The air heating branch 14 and cold air transmission branch 12 have a common inlet which is fed by the blower 10, and also a common outlet which is controlled by a mixing valve in the form of a flap valve 22, which determines the relative flow rates of cold air in the transmission branch 12 and hot air in the air heating branch 14. The mixing valve 22, being at the common outlet of the two branches, is therefore immediately upstream of a mixing zone 24 in which air from the two branches can be mixed at an adjustable temperature. This mixed air is passed from the mixing zone 24 (which it will be realised is divided into two parts by the bulkhead 18), towards at least one de-misting and deicing vent 26 for the windshield. The flow of air through this vent 26 is controlled by a flap valve 28, The mixed air is also passed from the mixing zone 24 towards at least one vent 30 which is open towards the lower part of the cabin H of the vehicle, and which is controlled by another flap valve 32. A further fraction of the mixed air is taken from the mixing zone 24 into two ducts 34 (FIG. 4) which serve a pair of side vents (not shown), arranged respectively on the right hand side and the left hand side of the fascia 36 of the vehicle. The stream of mixed air passing through the two side vent ducts 34 is controlled by two further flap valves which are not shown in the drawings.

The apparatus also includes means for distributing cold air and mixed air simultaneously through a ventilating or aerating outlet vent 38 (also referred to as an aerator vent) which is arranged in the centre of the fascia 36.

The casing 16 includes a central housing 40, which is defined by the bulkhead 18 and by an upwardly open portion 42 (FIGS. 6 and 7) of U-shaped cross section. This U-shaped portion 42 extends the bulkhead 18 upwardly, and lies symmetrically on either side of the plane of symmetry P (see FIG. 7) which is defined by this bulkhead. The Casing 16 also includes two side housings 44, lying in suymmetrical relationship on either side of the plane of symmetry P. These side housings 44 have respective upper walls 46, each of which terminates in a flange 48. These flanges 48 abut each other, so that the two upper walls 46 are joined together through the flanges 48 at an interface lying in the plane of symmetry P. Each side housing 44 also has a side wall 49 which is spaced away from the U-shaped portion 42 of the central housing 40. In this way, the central housing 40 and the two side housings 44 together define a first central duct 50 inside the U-shaped portion 42, together with two side ducts 52. Each side duct 52 lies between a side wall 54 of the U-shaped portion 42, and the side wall 49 of the corresponding side housing 44. The first central duct 50 is bounded at the bottom by a wall 56 of the U-shaped portion 42, which appears in FIG. 1 as well as in FIG. 7.

As is best seen in FIG. 6, the bulkhead 18 is formed with a slot 58 for accommodating the heat exchanger 20. The U-shaped portion 42 delimiting the central duct 50 extends from an inlet 60 (see FIGS. 1 and 6) to an outlet 62 shown in FIG. 6. The inlet 60 is arranged to be supplied with cold air by the blower 10, and the outlet 62 lies at the junction 64 at which the casing 16 is joined to an aerator duct 66 shown in FIG. 1. This duct 66 terminates at the aerator vent 38. The aerator duct 66 is bounded mainly by an upper wall 68, a lower wall 70, two side walls 72, and two baffles 74 which partly define the central duct 50 and the two side ducts 52 (see FIG. 4).

It will be realised that the casing 16 and the aerator duct 66 together define both the central duct 50, which is thereby arranged to deliver cold air from the inlet 60 of this duct to the aerator vent 38, and the two side ducts 52 through which the mixed air is conveyed from the mixing zone 24 to the aerator vent 38.

The apparatus includes a flap valve 76 (see FIGS. 1, 2 and 6), which is mounted for pivoting movement about an axis 78 extending at right angles to the plane of symmetry P. The flap valve 76 is arranged in the central duct 50, in an intermediate region of the latter lying between the inlet 60 and the outlet 62 at the junction 64. It can either close or open the central duct 50, so as to control whether or not the stream of cold air is delivered into the central portion of the aerator vent 38.

The apparatus also has two further flap valves 80, which are arranged at the inlets of the respective side ducts 52 which convey the mixed air, the valves 80 being arranged upstream of the junction 64. The two flap valves 80 are arranged, as can be seen in FIGS. 2 and 3, for pivoting movement on a common axis 82, which is again at right angles to the plane of symmetry P. The flap valves 80 control the flow rate of the mixed air stream which is delivered towards the two end or outer portions of the aerator vent 38, regardless of the position (i.e. whether open or closed) of the flap valve 76 arranged in the cold air duct.

The flap valve 76 and the two flap valves 80 are actuated by synchronised control means which are described in our co-pending French patent application No. 92 14523, filed on the same day as the French application on which the present application is based. The apparatus shown in FIG. 1, 4 and 5 also includes three air flow regulating flap valves, namely a central flap valve 84 and two side flap valves 86. These three valves are located immediately upstream of the aerator vent 38, and are mounted for pivoting movement about a common axis 87 (FIGS. 4 and 5). The central valve 84 is arranged in the central duct 50, and is controlled by a thumb wheel 88 through an actuating rod 89. Each of the side flap valves 86 is arranged in a respective one of the two side ducts 52, and is controlled, independently of any other valve by a corresponding thumb wheel 90, through a crank 92.

Figure 8:
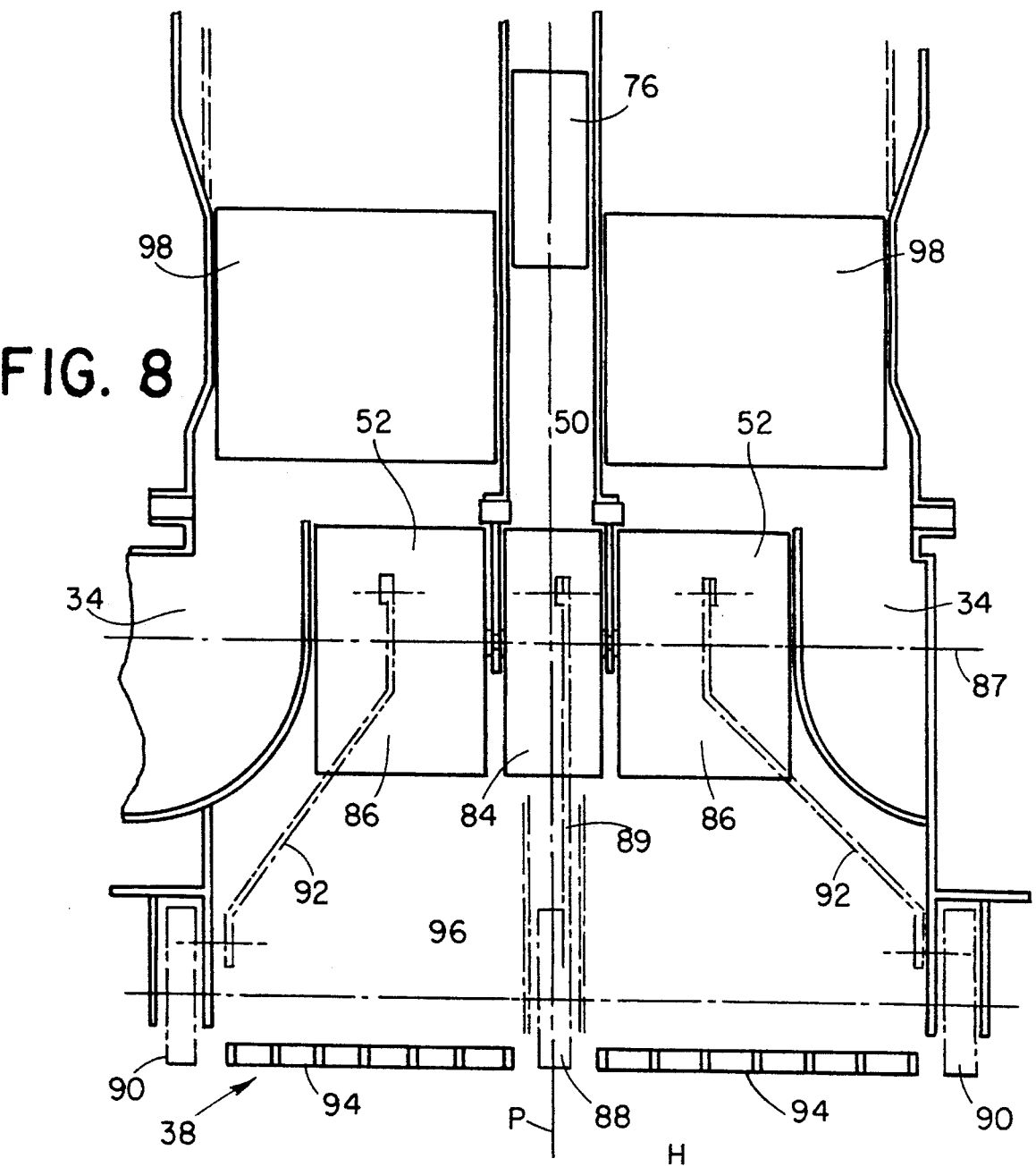
FIG. 8 is a partial view in cross section similar to that of FIG. 5, in one form of construction of the apparatus in accordance with the invention.

As can be seen more particularly in FIG. 8, the central flap valve 84 controls the flow of the cold air stream at the outlet of the first duct 50, which is either supplied or not supplied with cold air, according to whether the flap valve 76 is in the open position or closed position respectively. The central flap valve 84 is displaceable in a continuous manner between a fully open position of the duct 50 and a fully closed position of the duct 50, and it may assume an infinite number of intermediate positions according to the angular position of the thumb wheel 88. The two second or side flap valves 86 are arranged to control the flow of the mixed air stream at the outlet of the second or side ducts 52, separately from each other. Each of these pivoting side flap valves 86 is displaceable in a continuous manner between a position in which the corresponding side duct 52 is fully open and a position in which it is fully closed, and they may adopt an infinite number of intermediate positions according to the angular position of the corresponding rotatable thumb wheel 90.

Figure 9:
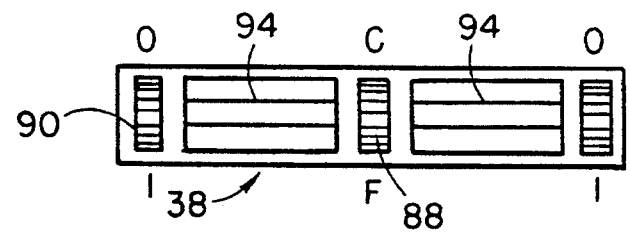
FIG. 9 is a front view of the aerator vent, but on a smaller scale.

Reference is now made to FIGS. 8 and 9, from which it can be seen that the aerator vent 38 has a generally rectangular shape, the major dimension of which lies horizontally, the vent being arranged in the centre of the fascia 36 (FIG. 6) of the vehicle. The aerator vent 38 includes two grilles 94, controllable separately from each other. Each of these grilles can be oriented into two positions at right angles to each other. The two grilles 94 lie symmetrically on either side of the vertical central plane of symmetry P of the vehicle. The thumb wheel 88 is arranged in a position intermediate between the two grilles 94, while the two thumb wheels 90 lie on either side of the two grilles 94. Thus, each of the latter is flanked on one side by a thumb wheel 90 and on the other by the thumb wheel 88.

The thumb wheel 88 is displaceable continuously between a "hot" position and a "cold" position which are indicated respectively by the letters C and F in FIG. 9. In these hot and cold positions, the flap valve 84 is, respectively, in its fully open and fully closed position with respect to the duct 50. Each of the thumb wheels 90 is displaceable continuously between a position in which the corresponding side duct 52 is fully open (represented by the index "1" in FIG. 9) and a position in which the corresponding side duct 52 is fully closed (represented by "0" in FIG. 9).

As can be seen in FIG. 8, the respective outlets of the central duct 50 and the two side ducts 52 lead into a mixing chamber 96, in which the cold air coming from the central duct 50 and the mixed air coming from the side ducts 52 are able to mix together before being delivered into the cabin of the vehicle via the aerator vent 38. It will be understood that a stream of mixed air flows through each of the grilles 94, each of these streams being the result of mixing of the mixed air stream from whichever one of the side ducts 52 is aligned with that grille, with part of the air stream from the central duct 50. In this way, the temperature of the air stream flowing through each of the grilles 94 can be made homogeneous, while the temperature of the two mixed streams flowing respectively through the two grilles 94 can be adjusted separately from each other. Thus, it is possible to send air streams at selected, and different, temperatures towards the driver's side and the passenger's side of the cabin.

Also shown in FIG. 8 are two further flap valves 98, which enable the respective flows of the mixed air streams distributed to the side vents, via the two side vent ducts 34 mentioned above, to be controlled in a known way.

The invention is of course not limited to the particular embodiment described above by way of example only. Thus, it is possible to provide only one air flow delivery duct and only one mixed air delivery duct, terminating at the common aerator vent. In addition, it will be understood that the flap valve 76 and the two flap valves 80 are not mandatory: they may be omitted altogether, or if desired they may be replaced by a Single flap valve as taught by the German patent specification DE 3 338 768A mentioned above.

What is claimed is:

1. Heating and ventilating apparatus for the cabin of a motor vehicle, comprising an aerator vent communicating with said cabin, means defining at least one first duct for leading a stream of cold air to said aerator vent, and means defining at least one second duct for leading a stream of mixed air to said aerator vent, each said duct having an outlet end, wherein the apparatus further includes: a first flap valve associated with the outlet end of said at least one first duct for controlling the flow of said cold air from the latter; a second flap valve associated with the outlet of said at least one second duct for controlling the flow of said mixed air from the latter; first control means coupled with the first flap valve for controlling the first flap valve; and second control means coupled with the second flap valve for controlling the second flap valve.

2. Apparatus according to claim 1, wherein the first flap valve comprises a pivotable valve member defining a fully closed position and a fully open position in which said first duct is fully closed and fully open respectively, said first control means being adapted to put the first flap valve in a multiplicity of positions between its said fully open and fully closed positions.

3. Apparatus according to claim 1, wherein said second flap valve comprises a pivotable valve member defining a fully open position and a fully closed position in which the corresponding said second duct is fully open and fully closed respectively, said second control means being arranged to put the second flap valve into a multiplicity of positions between its said fully open and fully closed positions.

4. Apparatus according to claim 1, wherein said first control means comprise a rotatable thumb wheel and a coupling member coupling said thumb wheel to the first flap valve.

5. Apparatus according to claim 1, wherein said second control means comprise a rotatable thumb wheel and a coupling member coupling said thumb wheel to said second flap valve.

6. Apparatus according to claim 1 having a single said first duct for delivering cold air and two said second ducts for delivering mixed air, said first duct being arranged between the second ducts, with each said second duct having a corresponding said second flap valve.

7. Apparatus according to claim 6, wherein the aerator vent comprises two grilles, consisting of a first grille associated with the first duct and with one of the second ducts, and a second grille associated with the first duct and with the other second duct, whereby part of the cold air stream from the first duct passes through each grille and the whole of the mixed air stream from each second duct passes through a respective one of the grilles.

8. Apparatus according to claim 7, wherein said first control means comprise a rotatable thumb wheel disposed in a position intermediate between the two grilles, with means coupling said thumb wheel to said first flap valve, said second control means comprising two further rotatable thumb wheels, disposed on either side of the two grilles, and means coupling each said further thumb wheel to a respective one of said second flap valves.

9. Apparatus according to claim 1, further including means defining a mixing chamber between the respective outlets of the first and second ducts on the one hand, and the aerator vent on the other.

* * * * *